United States Patent

Akedo et al.

[11] Patent Number: 6,024,134
[45] Date of Patent: Feb. 15, 2000

[54] FLEXIBLE HOSE

[75] Inventors: Youichi Akedo; Seiji Shiga; Tetsuya Inagake; Shoji Hattori; Yoshiki Yoshitomi; Hitoya Kodama; Masataka Morikawa, all of Kakegawa, Japan

[73] Assignee: Tigers Polymer Corporation, Osaka, Japan

[21] Appl. No.: 09/140,420

[22] Filed: Aug. 26, 1998

[30] Foreign Application Priority Data

Sep. 5, 1997 [JP] Japan .................................. 9-257881

[51] Int. Cl.⁷ ................................................ F16L 11/04
[52] U.S. Cl. .................... 138/129; 138/122; 138/132; 138/144; 138/153; 138/154
[58] Field of Search .................................... 138/129, 124, 138/125, 132, 144, 153, 154, 122

[56] References Cited

U.S. PATENT DOCUMENTS

| | | | |
|---|---|---|---|
| 3,524,779 | 8/1970 | Masters et al. | 138/144 |
| 3,886,029 | 5/1975 | Poulsen | 138/144 |
| 4,081,302 | 3/1978 | Drostholm et al. | 138/143 |
| 4,445,543 | 5/1984 | Mead | 138/122 |
| 4,657,049 | 4/1987 | Fourty et al. | 138/133 |
| 5,538,513 | 7/1996 | Okajima | 138/124 |
| 5,918,642 | 7/1999 | Akedo et al. | 138/129 |

*Primary Examiner*—James Hook
*Attorney, Agent, or Firm*—Pillsbury Madison & Sutro LLP

[57] ABSTRACT

A laminated tape comprising a main layer of a polyester-series thermoplastic polyurethane resin and a covering layer formed of a soft vinyl chloride resin fused with at least one surface of the main layer is spirally wound, and its adjacent side edges are bonded each other to form a hose wall. The shrinkage ratio of the length of the hose in an unloaded condition is 25% or less relative to the original length of the hose as determined by measuring the original length and the length of the hose after the test which comprises subjecting the hose compressed in a longitudinal direction to ten heating/cooling-cycles successively, one cycle comprising a heating step for exposing the compressed hose to an atmosphere of 70° C. for two hours and a cooling step for cooling the heat-treated hose at an atmosphere of −20° C. for two hours, followed by returning the temperature of the hose to an ordinary or room temperature and allowing the hose to stand for one hour. According to the present invention, the drawbacks such as the strong inclination to shrink and the great pressure loss are improved, and the degradation of various physical properties by ultraviolet ray and hydrorization is prevented.

5 Claims, 3 Drawing Sheets

FLEXIBLE HOSE

FIELD OF THE INVENTION

The present invention relates to a flexible hose comprising a hose wall mainly formed with a thermoplastic polyurethane resin (particularly, a polyester-series thermoplastic polyurethane resin). In more detail, the present invention relates to a flexible hose (e.g. a duct hose such as air ducts) which is useful for transporting various gases.

BACKGROUND OF THE INVENTION

As the duct hose mentioned above, there have been popularly used hoses which comprise a hose wall formed by spirally winding a tape of a soft polyvinyl chloride resin (a plasticized polyvinyl chloride resin) and bonding its side edges each other, and a hard spiral reinforcement comprising a hard wire covered with a polyvinyl chloride resin or a hard spiral reinforcement of a hard polyvinyl chloride resin (non-plasticized polyvinyl chloride resin).

Usually, a hose wall of a duct hose of a synthetic resin is formed in the form of a bellows structure to give a flexibility, and the hose is transported or stored in a compressed state for compactness. As to storing circumstances, a storing temperature is in a wide range of as low as around −20° C. to as high as around 70° C., and it is often stored for quite a long period.

In the above case, when trying to lay a duct hose formed mainly with a vinyl chloride resin, the duct hose can not be reverted to the original length in a normal state because of its having been compressed for storage and caused shrinking kinks. As a result, the length of the hose is much shorter than the original length and consequently the hose is required to have the additional length allowing for shrinkage. In addition to such problems, there has been a problem that inwardly folded wall due to shrinkage results in an increased pressure loss.

For solving the problems of a vinyl chloride resin such as the formation of the shrinking kinks, there has been used mainly, as a synthetic resin material having a high impact resilience and hardly shrinks, a thermoplastic polyurethane resin, particularly a polyester-series thermoplastic polyurethane resin which is inexpensive, to form a duct hose.

However, a polyester-series thermoplastic polyurethane resin is degraded by ultraviolet rays, and the ester bonds of the polyester-series thermoplastic polyurethane are cleft with hydrolysis by exposure to a high temperature and high humidity for a long time, e.g., rain or the conveyance of aqueous liquids and the like. As a result, its physical properties such as wear resistance, flexibility and resilience are deteriorated.

SUMMARY OF THE INVENTION

It is, therefore, an object of the present invention to provide a duct hose which has a high flexibility and durability, and hardly shows a shrinking kink (shrinking tendency).

It is another object of the present invention to provide a flexible hose which is capable of reverting its original length even after being stored in a compressed state in a longitudinal direction, of being easily stretched and of preventing pressure loss from lowering.

The flexible hose of the present invention has the following structures:

(1) A flexible hose, which comprises a main layer of a polyester-series thermoplastic polyurethane resin, a covering layer of a soft resin (e.g., a soft vinyl chloride resin) laminated on at least one surface of the main layer for forming a laminated tape, a hose wall formed by spirally winding the laminated tape and bonding the adjacent side edges of the covering layer each other and a hard spiral reinforcement for reinforcing the hose wall and retaining the hose configuration, wherein the shrinkage ratio of the length of the hose relative to the original length of the hose is 25% or less as determined by measuring the original length and the length of the hose in a normal condition (no-loading condition) after the test which comprises subjecting a hose compressed in a longitudinal direction to ten heating-cooling cycles successively, one cycle comprising heating step for exposing the compressed hose to an atmosphere of 70° C. for two hours, and cooling step for cooling the heat-treated hose at −20° C. for two hours, followed by returning the temperature to an ordinary or room temperature and allowing the hose to stand for one hour.

(2) The hose wall may comprise a main layer and a covering layer laminated on both inner and outer surfaces of the main layer. The thickness ratio of the main layer relative to the hose wall is about 0.7 to 0.95.

PREFERRED EMBODIMENTS OF THE INVENTION

Figure 1:
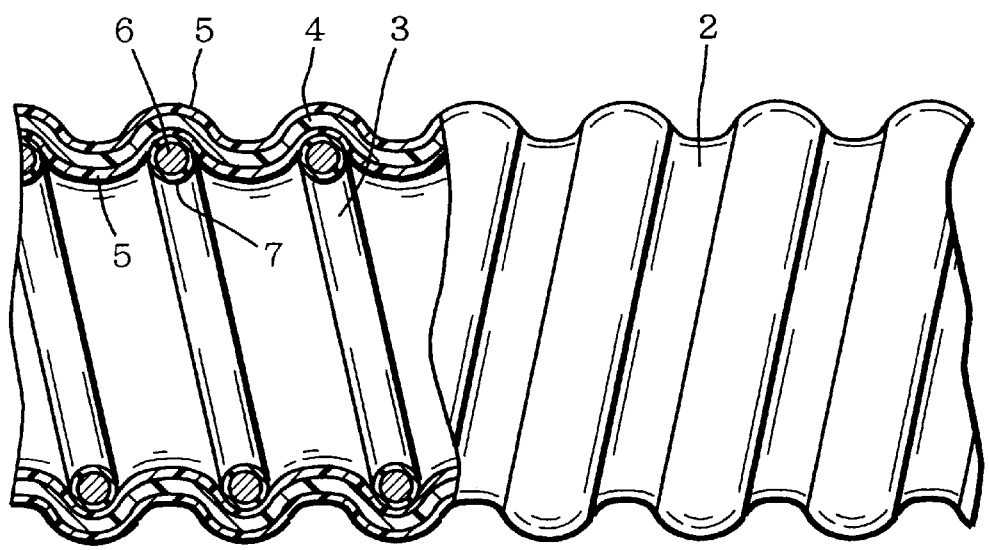
FIG. 1 is a partial sectional view showing one embodiment of the duct hose of the present invention.

The type of a polyester-series thermoplastic polyurethane resin is classified according to the species of a polyol component used as a soft segment. In this specification, a polyester-series thermoplstic polyurethane resin for forming the main layer of the hose wall indicates not only a thermoplastic polyurethane (TPU) prepared by use of a polyester polyol, but also a blend of the thermoplastic polyurethane with a thermoplastic resin such as a polyvinyl chloride, a polyester and polyamide, unless such incorporation of the thermoplastic resin alters the properties of the resin to a great extent.

A polyester-series thermoplastic polyurethane resin affords a hose a high flexibility and good impact resilience, and has excellent adhesion to a vinyl chloride resin. Thus, the use of a polyester-series thermoplastic polyurethane resin gives advantages that a hose wall comprising a main layer and a covering layer or covering layers of a soft vinyl chloride resin (a plasticized vinyl chloride resin) bonded and united with the inner surface and/or the outer surface of the main layer can be easily formed by extruding a laminated tape comprising a layer of a polyester-series thermoplastic polyurethane resin and a layer of a vinyl chloride resin directly fused each other in a crosshead of an extruder, and, as a result, the main layer formed with a polyester-series thermoplastic polyurethane resin is prevented from being hydrorized.

The shrinkage ratio (X), expressed as a percentage, of the hose length after the heating/cooling-cycle test is calculated by the following formula:

$$X = [(L-M)/L] \times 100$$

wherein "L" represents the length of the hose in a normal state before being tested and "M" shows the length of the hose in an unloaded condition after the test.

The hose of the present invention has a shrinkage ratio of 25% or less, preferably 20% or less and more preferably 15% or less.

As to the thickness ratio of the main layer and the covering layer(s) forming the hose wall, it is preferable to raise the thickness ratio of the main layer relative to the covering layer(s) to the level as high as possible in order to fully exhibit the excellent properties of the polyester-series thermoplastic polyurethane resin. The thickness ratio may be arbitrarily selected, provided that the shrinkage ratio (X) is maintained in the range of 25% or less, and the thickness ratio of the main layer relative to the hose wall is preferably 0.7 to 0.95 and more preferably 0.7 to 0.9.

The polyester-series thermoplastic polyurethane resin for forming the main layer can be produced by the rection of a polyester polyol (particularly, polyester diol) as a polyol component with a polyisocyanate (particularly, diisocyanate). A polyester polyol may be produced by a conventional manner, for example, an esterification of a polycarboxylic acid component or its reactive derivative with a polyol component, a ring-opening polymerization of a lactone (e.g., caprolactone), and a reaction of a polycarboxylic acid component or its reactive derivative with a polyol component and a lactone (e.g., caprolactone). The polyester polyol includes, for example, a polyester diol prepared by the reaction of an aliphatic saturated dicarboxylic acid and an aliphatic diol, and if necessary with an aromatic dicarboxylic acid or anhydride thereof and/or a lactone. Examples of the aliphatic dicarboxylic acid includes an $C_{4-12}$ aliphatic saturated dicarboxylic acid such as adipic acid, pimelic acid, azelaic acid, and sebacic acid. As the aliphatic diol, there may be mentioned, for example, an $C_{2-1}$, alkylene glycol such as ethylene glycol, propylene glycol, butane diol, pentane diol, hexane diol, neopentyl glycol, and the like; a polyoxyalkylene glycol such as diethylene glycol, triethylene glycol, polyethylene glycol, dipropylene glycol, polypropylene glycol, polytetramethylene glycol, an ethylene glycol-propylene glycol block copolymer and the like. Preferred polyesters include, for example, a $C_{4-12}$ aliphatic saturated dicarboxylic acid-based diols such as an adipic acid-based diol, a pimelic acid-based diol, an azelaic acid-based diol, and a sebacic acid-based diol.

The covering layer may be formed on at least one surface of the main layer. Usually, the covering layer is formed on both surfaces of the main layer. As a soft resin for forming the covering layer, there may be mentioned, for example, an ethylene-vinyl acetate copolymer, an ethylene-(meth) acrylate copolymer, an ethylene-(meth)acrylic acid copolymer, an ethylene-propylene copolymer, a soft vinyl chloride resin and so on. The soft vinyl chloride resin is preferable for forming the covering layer.

Hereinafter, referring to the drawings, the examples of the flexible hose of the present invention will be explained.

In FIG. 1, a duct hose 1 comprises a hose wall 2 of a corrugated configuration and a spiral hard reinforcement 3 adhered or thermally fused to the inner surface of the hose wall 2. The hose wall 2 (thickness: 0.5 mm) has a laminate structure comprising a main layer 4 (thickness: 0.4 mm) and covering layers 5,5 adhered or thermally fused to the inner and outer surfaces of the hose wall 2 (the thickness of each covering layer is 0.05 mm).

The main layer 4 of the hose wall 2 is formed with a polyester-series thermoplastic polyurethane resin. The covering layers 5,5 are formed with a soft resin such as a soft vinyl chloride resin, united with the main layer 4 by thermal fusing or thermal lamination. Moreover, the hard reinforcement 3 to be adhered to the hose wall 2 comprises a hard wire 6 and a coated layer 7 formed on the hard wire 6, and the coated layer 7 is formed with a soft resin such as a vinyl chloride resin which is the same material of the covering layer 5, i.e., a vinyl chloride resin, and thus intimately adheres to the covering layer 5. Therefore, the hard reinforcement 3 is firmly adhered and united with the covering layer 5.

The above-mentioned duct hose 1 is formed by the steps of;

spirally winding a laminated tape around an outer periphery of the hard reinforcement 3 having a diameter of 1.5 mm, and the laminated tape is extruded from an extruder and comprising a polyester-series thermoplastic polyurethane resin layer and a soft vinyl chloride resin layer fused and united with both inner and outer surfaces of the polyester-series thermoplastic polyurethane resin layer, uniting the adjacent side edges of the laminated tape each other by thermally fusing to form the main layer 4 and the covering layers 5,5 simultaneously, and uniting and fixing the coated layer 7 of the hard reinforcement 3 to the inner covering layer 5.

In this case, the outer diameter and the inner diameter of the hose are formed to be 63.5 mm and 58.5 mm, respectively.

Figure 4:
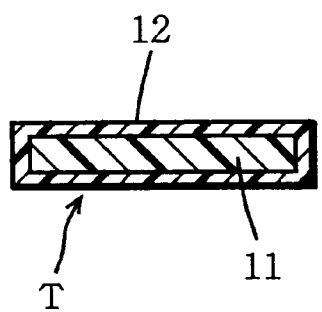
FIG. 4 is a sectional view showing an example of a laminated tape.

A laminated tape T shown in FIG. 4 may be used, which is an extruded tape extruded from an extruder and comprises a polyester-series polyurethane resin layer 11 and a covering layer 12 of a soft vinyl chloride resin covering the whole circumference, i.e., the inner surface, the outer surface and both side surfaces, of the polyester-series thermoplastic polyurethane resin layer 11, and the polyurethane resin layer 11 is fused and united with the covering layer 12 of a soft vinyl chloride. In this case, the hose wall is formed by spirally winding the laminated tape T with fusing the adjacent side edges of the covering layer 12.

Moreover, as the above laminated tape, according to the intended applications of the hose, a laminated tape extruded from an extruder with thermally laminating and uniting a soft resin layer such as a soft vinyl chloride resin layer with either inner surface or outer surface of the polyester-series thermoplastic polyurethane resin layer may be used to form a protecting layer of the soft resin on either inner or outer surface of the hose.

Figure 2A:
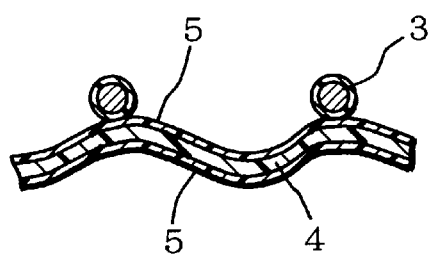
FIGS. 2A and B show a partially enlarged sectional view of other embodiments of the present invention.
Figure 2B:
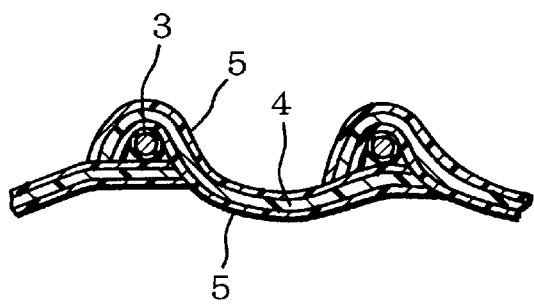

FIG. 2 shows another embodiments of the duct hose 1. The embodiment (A) shows "an outer wire-type hose" which comprises a main layer 4 of the hose wall, an outer protecting layer 5 for protecting the main layer from hydrolysis, and a hard spiral reinforcement 3 adhered to the outer protecting layer. The embodiment (B) is "aburiedwire-type hose" in which a laminated tape is wound so as to be in a relation where the mutually adjacent side edges of the tape are overlapped, and to the overlap (the boundary area between the inner layer and the outer layer) is inserted the hard spiral reinforcement 3. Other structures are the same as those of the embodiment mentioned above.

Figure 3A:
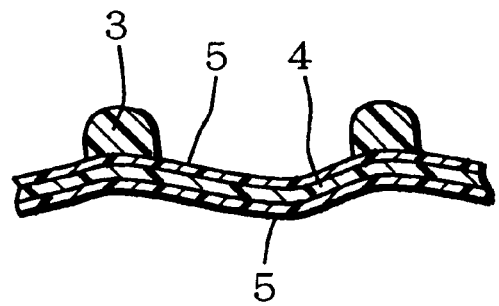
FIGS. 3A and B show a partially enlarged sectional view of other embodiments of the present invention.
Figure 3B:
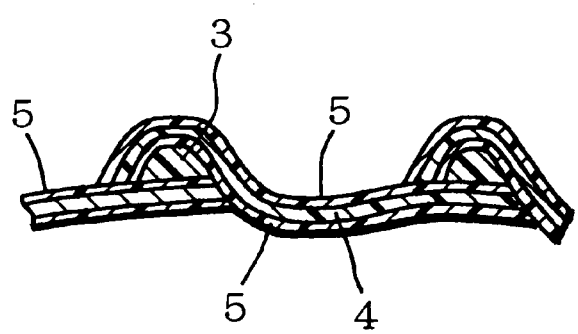

FIG. 3 shows another embodiments of the duct hose. In each embodiment, a hard synthetic resin (e.g., a hard vinyl chloride resin) employed as a hard spiral reinforcement 3 is bonded or fixed to the covering layer 5 of the main layer 4 of the hose wall. As is the same in FIG. 4, the embodiment (A) represents an outer wire-type duct hose, and the embodiment (B) represents a buried wire-type duct hose. Also in these embodiments, the hard spiral reinforcement 3 and the covering layer 5 may be formed with the same material, i.e., a vinyl chloride resin. Consequently, the adhesion between the two elements is improved and the improved adhesion strength is realized.

Figure 5A:
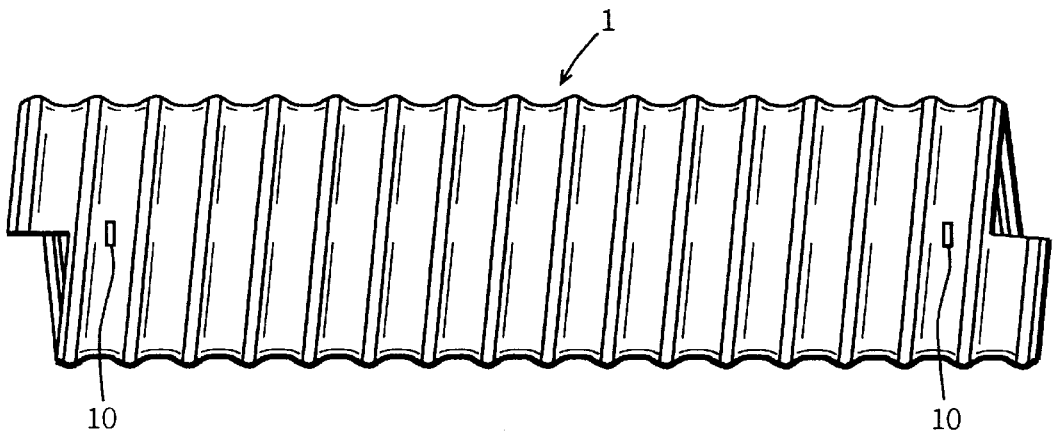
FIGS. 5A–C are a schematic view for explaining the heating/cooling-cycle test.
Figure 5B:
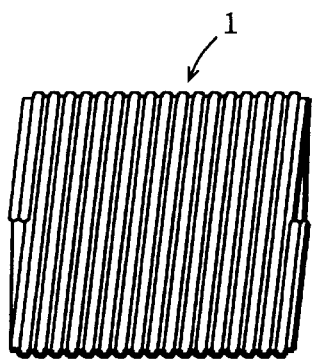
Figure 5C:
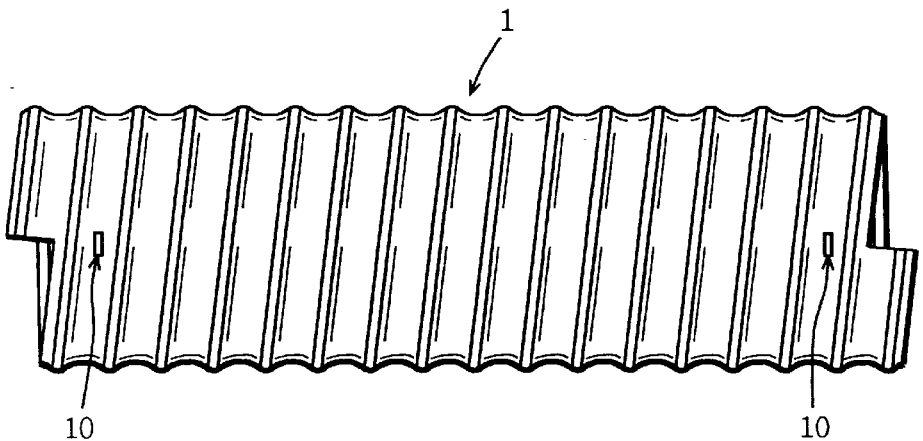

FIG. 5 illustrates a heating/cooling-cycle test in detail. As shown in FIG. 5 (A), marked lines 10,10 are put on the duct hose 1 in a normal state (no-loaded condition) at an arbitrary spacing, e.g., 500 mm. Then, as shown in FIG. 5 (B), the duct hose 1 is compressed or contracted in the axial direction and fixed with a suitable fixing means to maintain its compactness (compressed state).

After the compact duct hose 1 is subjected to ten cycles of alternate exposure to a high-temperature atmosphere and to a low-temperature atmosphere consecutively (one cycle: at 70° C. for two hours, and then at −20° C. for two hours), the temperature is raised to a room or ordinary temperature and allowed to stand for one hour. Then, as shown in FIG. 5 (C), the fixation of the compact duct hose 1 is released, and the duct hose is manually stretched to the original length and allowed to be in a normal state, and the distance between the marked lines 10, 10 is measured.

The shrinkage ratio of the duct hose shown in FIG. 1, expressed as a percentage, is measured in such manner, and the measurement revealed the fact that the hose with the marking lines 10, 10 of, before being tested, 500 mm distance had shrunken to, after the test, 434 mm. The shrinkage ratio was calculated by the formula: (500−434)/500×100, and the value was 13%.

The same test as the above was conducted on duct hoses which are similar in structure to those of the above embodiments and have the inside diameter of 100 mm and 125 mm, respectively. The shrinkage ratio of each duct hose was 13%. On the other hand, as a comparative example, the above-mentioned test was conducted on a duct hose made of a soft vinyl chloride, and the shrinkage ratio was as high as about 50%.

Hoses according to the present invention have a high impact resilience and remarkably low shrinkage. Therefore, the advantages of the present invention resides in that the length of the hose can be efficiently utilized, that the pressure loss is small, and that its durability is excellent. As a result, the present invention can be favorably used as a duct hose with good flexibility.

What is claimed is:

1. A flexible hose, which comprises a main layer of a polyester-series thermoplastic polyurethane resin, a covering layer of a soft resin laminated on at least one surface of the main layer for forming a laminated tape, a hose wall formed by spirally winding the laminated tape and bonding the adjacent side edges of the covering layer each other, and a hard spiral reinforcement for reinforcing the hose wall and retaining the hose configuration, wherein the shrinkage ratio of the length of the hose in a normal condition (unloaded condition) is 25% or less relative to the original length of the hose as determined by measuring the original length and the length of the hose after the test which comprises subjecting the hose compressed in a longitudinal direction to ten heating/cooling-cycles successively, one cycle comprising a heating step for exposing the compressed hose to an atmosphere of 70° C. for two hours and a cooling step for cooling the heat-treated hose at −20° C. for two hours, followed by returning the temperature to an ordinary or room temperature and allowing the hose to stand for one hour.

2. A flexible hose as claimed in claim 1, wherein said soft resin covering layer is formed with a soft vinyl chloride resin.

3. A flexible hose as claimed in claim 1, wherein said hose wall comprises said main layer and covering layers laminated on both inner and outer surfaces of the main layer.

4. A flexible hose as claimed in claim 1, wherein the thickness ratio of said main layer relative to the hose wall is 0.7 to 0.95.

5. A flexible hose as claimed in claim 1, wherein the thickness ratio of the said main layer relative to said hose wall is 0.7 to 0.9.

* * * * *